(12) United States Patent
Sloan et al.

(10) Patent No.: US 7,908,828 B2
(45) Date of Patent: Mar. 22, 2011

(54) STORAGE CASE HAVING A MEDIA RETENTION DEVICE

(75) Inventors: Chris David Sloan, Ventura, CA (US); Dion Topping Johnston, Newbury Park, CA (US); Lee Brain Vanhouten, Ventura, CA (US); Gary James Gwizdala, Westlake Village, CA (US); Jose Eligio Perez, Bellflower, CA (US); Steven Michael Montgomery, Los Angeles, CA (US); Gregory Edward Mote, Los Angeles, CA (US); Kirk Litzsinger, Simi Valley, CA (US)

(73) Assignee: Thomson Licensing, Boulogne-Billcourt (FR)

( * ) Notice: Subject to any disclaimer, the term of this patent is extended or adjusted under 35 U.S.C. 154(b) by 201 days.

(21) Appl. No.: 12/224,536

(22) PCT Filed: Jun. 28, 2006

(86) PCT No.: PCT/US2006/025230
§ 371 (c)(1),
(2), (4) Date: Aug. 28, 2008

(87) PCT Pub. No.: WO2007/100344
PCT Pub. Date: Sep. 7, 2007

(65) Prior Publication Data
US 2009/0056284 A1    Mar. 5, 2009

Related U.S. Application Data

(60) Provisional application No. 60/779,023, filed on Mar. 3, 2006.

(51) Int. Cl.
*B65D 85/57* (2006.01)
*G11B 23/03* (2006.01)

(52) U.S. Cl. .................................. 53/474; 206/308.1

(58) Field of Classification Search ............... 53/443, 53/445, 474, 155, 157, 532, 254, 238; 206/308.1, 206/310, 312
See application file for complete search history.

(56) References Cited

U.S. PATENT DOCUMENTS 774,037 A * 11/1904 Burgi .......................... 206/312
(Continued)

FOREIGN PATENT DOCUMENTS

FR        2866146        8/2005
(Continued)

OTHER PUBLICATIONS

International Search Report, dated Nov. 16, 2006, for application PCT/US2006/025230.

*Primary Examiner* — Stephen F Gerrity
(74) *Attorney, Agent, or Firm* — Robert D. Shedd; Paul P. Kiel

(57) ABSTRACT

A case for holding a DVD or other device may include a flexible clip arm for, e.g., retaining printed information about the DVD, holding the DVD, and/or locking one or more DVDs in place. An apparatus includes a body configured to retain a first disc. The apparatus further includes a retention device coupled to the body and configured to apply pressure to material disposed between the retention device and the body and thereby to assist in retaining the material between the retention device and the body. A method includes inserting a first disc into a container configured to retain the first disc. The method further includes securing material within the container using a retention device coupled to the container and configured to apply pressure to the material and thereby to assist in retaining the material within the container. Other implementations focus on holding or locking a DVD, or other device.

19 Claims, 6 Drawing Sheets

U.S. PATENT DOCUMENTS

| | | | | |
|---|---|---|---|---|
| 1,554,995 | A * | 9/1925 | Fetters | 206/310 |
| 2,500,773 | A * | 3/1950 | Robins | 206/310 |
| 2,600,023 | A * | 6/1952 | Rice | 206/310 |
| 2,881,912 | A * | 4/1959 | Kursh | 206/312 |
| 3,987,900 | A * | 10/1976 | Tadokoro et al. | 206/308.3 |
| 4,793,480 | A * | 12/1988 | Gelardi et al. | 206/308.1 |
| 5,279,097 | A * | 1/1994 | Weisburn et al. | 53/445 |
| 5,295,577 | A * | 3/1994 | Minter | 206/312 |
| 5,381,894 | A | 1/1995 | Misterka et al. | |
| 5,477,961 | A | 12/1995 | Taniyama | |
| 5,515,967 | A * | 5/1996 | Fitzsimmons et al. | 206/308.1 |
| 5,573,120 | A | 11/1996 | Kaufman et al. | |
| 5,579,297 | A | 11/1996 | Childers et al. | |
| 5,586,741 | A * | 12/1996 | Cuneo | 248/229.26 |
| 5,682,989 | A * | 11/1997 | Taniyama | 206/308.1 |
| 5,782,348 | A | 7/1998 | Burdett | |
| 5,842,563 | A * | 12/1998 | Herr et al. | 206/308.1 |
| 5,887,714 | A * | 3/1999 | Yeo | 206/308.1 |
| 6,024,214 | A | 2/2000 | Cowan | |
| 6,172,962 | B1 | 1/2001 | Goto et al. | |
| 6,283,284 | B1 * | 9/2001 | Crane et al. | 206/310 |
| 6,354,434 | B1 * | 3/2002 | Stamer | 206/308.1 |
| D456,166 | S * | 4/2002 | Seltzer | D6/407 |
| 6,363,987 | B1 * | 4/2002 | Koch | 206/308.1 |
| 6,371,300 | B1 | 4/2002 | Uchida | |
| 6,382,414 | B1 | 5/2002 | Chang | |
| 6,683,847 | B2 * | 1/2004 | Kutaragi et al. | 720/703 |
| 6,702,110 | B1 * | 3/2004 | Flores, Jr. et al. | 206/310 |
| 6,799,677 | B2 | 10/2004 | Marsilio et al. | |
| 6,886,687 | B2 | 5/2005 | Bolongia et al. | |
| 6,991,099 | B2 * | 1/2006 | Delaere et al. | 206/308.1 |
| 2003/0052022 | A1 | 3/2003 | Tempongko | |
| 2003/0150755 | A1 * | 8/2003 | Chen | 206/310 |
| 2004/0139461 | A1 * | 7/2004 | Yamagishi et al. | 206/308.1 |
| 2004/0144663 | A1 * | 7/2004 | Chang | 206/310 |
| 2004/0200743 | A1 * | 10/2004 | Delaere et al. | 206/308.1 |
| 2004/0206641 | A1 | 10/2004 | Lau | |
| 2004/0262177 | A1 * | 12/2004 | Rossiter | 206/312 |
| 2005/0045502 | A1 | 3/2005 | Okita | |
| 2005/0150791 | A1 * | 7/2005 | Osborn et al. | 206/308.1 |
| 2005/0274636 | A1 | 12/2005 | Choi | |
| 2006/0169606 | A1 | 8/2006 | Zamarron Pinilla et al. | |
| 2006/0243613 | A1 * | 11/2006 | Murata et al. | 206/308.1 |
| 2007/0138039 | A1 * | 6/2007 | Kirtz et al. | 206/308.1 |
| 2007/0175775 | A1 * | 8/2007 | Boland | 206/308.1 |

FOREIGN PATENT DOCUMENTS

| | | |
|---|---|---|
| GB | 2154550 | 9/1985 |
| GB | 2318570 | 4/1998 |
| GB | 2414508 | 11/2005 |
| JP | 55122272 A * | 9/1980 |
| JP | 2001114374 | 4/2001 |
| JP | 200354675 | 2/2003 |
| JP | 2004359261 | 12/2004 |
| WO | WO 9321086 A1 * | 10/1993 |
| WO | WO02066342 | 8/2002 |
| WO | WO03004812 | 1/2003 |
| WO | WO2004024599 | 3/2004 |
| WO | WO2004053878 | 6/2004 |
| WO | WO2004097833 | 11/2004 |
| WO | WO2005000713 | 1/2005 |
| WO | WO2005020240 | 3/2005 |

* cited by examiner

STORAGE CASE HAVING A MEDIA RETENTION DEVICE

CROSS-REFERENCE TO RELATED APPLICATIONS

This application claims the benefit, under 35 U.S.C. §365 of International Application PCT/US2006/025230 filed Jun. 28, 2006 which was published in accordance with PCT Article 21(2) on Sep. 7, 2007 in English and which claims the benefit of United States provisional patent application No. 60/779,023 filed Mar. 3, 2006.

TECHNICAL FIELD

This disclosure relates to storage containers.

BACKGROUND

DVD (Digital Versatile Disc, or also referred to as Digital Video Disc) cases may contain one or more DVDs. Within a typical single-disc DVD case, the disc is usually retained on the inner right panel by a hub that holds the disc. Some DVD cases allow multiple DVDs to be stored on the hub. DVD cases also typically provide a mechanism for retaining and displaying printed material.

SUMMARY

According to an implementation, an apparatus includes a body configured to retain a first disc. The apparatus also includes a retention device coupled to the body and configured to apply pressure to material disposed between the retention device and the body and thereby to assist in retaining the material between the retention device and the body.

The details of one or more implementations are set forth in the accompanying drawings and the description below. Other features will be apparent from the description and drawings, and from the claims.

DETAILED DESCRIPTION

Typical single-disc DVD packaging does not permit the inclusion of a second disc hub along with the ability to retain leaflets or promotional material. Further, typical disc security is based upon a ridge or wall around the disc that endeavors to prevent disc removal unless the case is first opened. However, this security is often insufficient because, for example, it is possible to cut the wrapping, shake the disc off its hub, and allow the disc to fall out of the base of the case.

This disclosure presents various implementations of, for example, a DVD case that can be opened to show an inner left panel and an inner right panel, with both panels joined by an integral hinge. Commonly, the inner right panel includes a first hub that retains a first disc. Several implementations use a flexible clip arm secured at the outermost side of the inner left panel, and the clip arm typically has one or more of the following three functions.

First, the clip arm may be lifted to allow the insertion and subsequent retention of leaflets or promotional literature along with the first disc, such as, for example, the information normally included with a commercially purchased DVD. Second, the clip arm may provide a second hub to facilitate the inclusion of a second disc within the DVD case by fastening the second disc to the second hub. Third, when the DVD case is closed, the clip arm may help to retain the first disc by, for example, having the second hub or some other portion of the clip arm (or of the case) engage the first hub or the first disc itself.

Regarding the third function, the clip arm may help to retain the first disc by, for example, including a portion that protrudes through the hole in the first disc when there is no hub fastening the first disc. The protruding portion need not protrude all the way through the hole, but may, more generally, simply cross the uppermost plane of the first disc.

A flexible clip arm implementing the third function may prevent disc removal without first opening the case. This is a result of the second hub engaging, for example, one or more of the first hub and the first disc. The engagement imposes a physical barrier to removing either the first disc or second disc unless the DVD case is first opened. This barrier also is integral to the case, and the fact that the barrier is integral may provide additional security against a disc being removed.

Each of the above three functions can be achieved in isolation without the other two, or any combination of the three can be achieved. Thus, for example, the second disc can be included in the case and fastened to the second hub while also allowing leaflets or other material to be inserted. As further examples, a case may include a device for holding a disc and securing printed information, and/or a case may engage a disc so as to provide a physical barrier inhibiting dislodgement of the disc from a hub.

Figure 1:
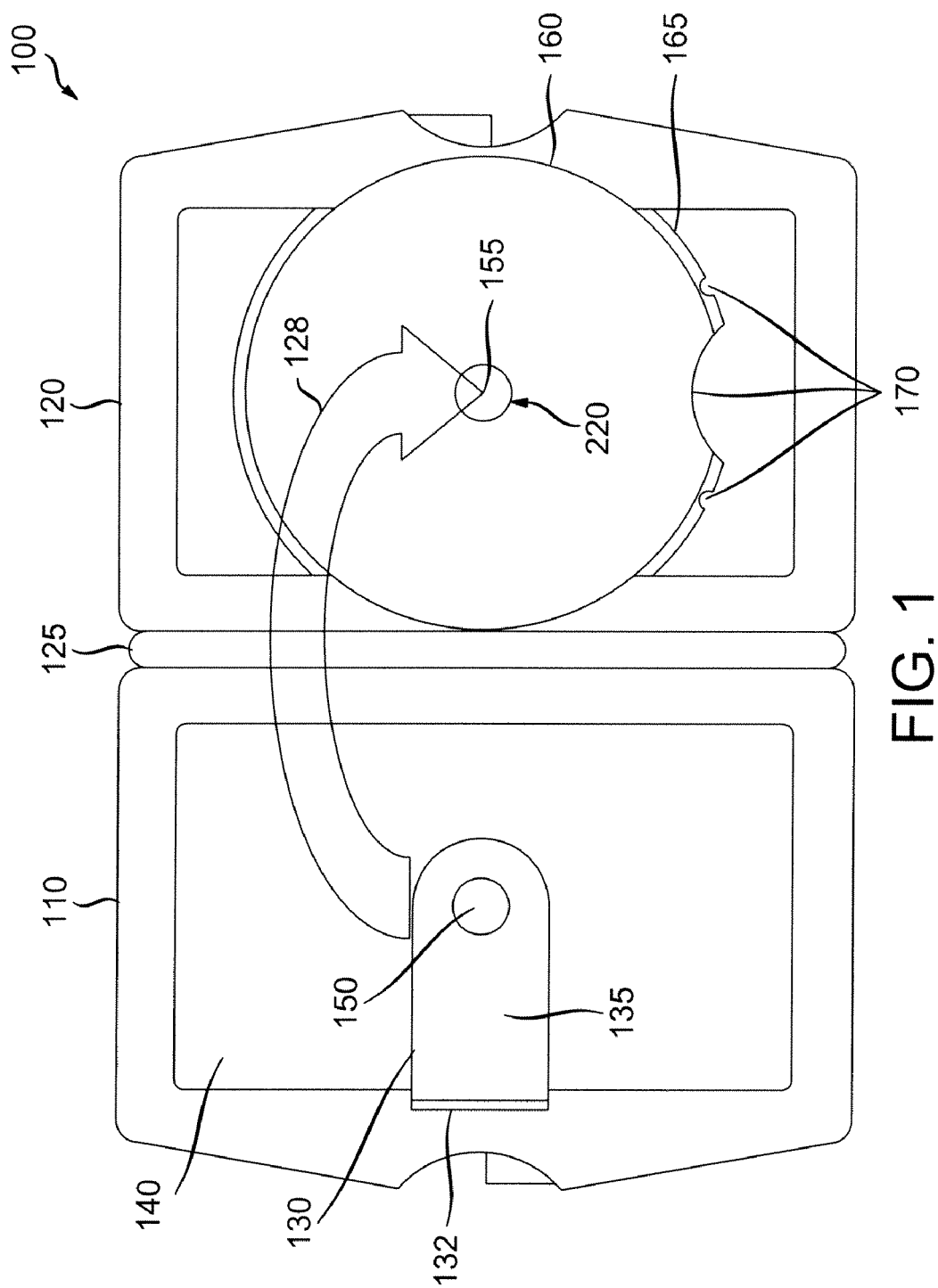
FIG. 1 shows an implementation of a case opened to reveal a leaflet clip.

Referring to FIG. 1, a top view of an opened DVD case 100 that is laying flat is shown. The case 100 includes a left side 110 and a right side 120 joined by an integral hinge 125 that allows the left side 110 to fold over and overlie the right side 120. The folding over of the left side 110 over on top of the right side 120 is indicated by an arrow 128. The left side 110 includes a leaflet clip 130 that is, in the implementation shown, molded to the body of the case 100 at a position 132. The leaflet clip 130 includes a body portion 135 that acts as a leaf spring to retain pamphlets, leaflets, or other material 140 that may be inserted under the leaflet clip 130 as indicated in FIG. 1. The leaflet clip 130, or at least a portion thereof, conforms to the size of the material 140 to apply pressure and to retain the material 140. The leaflet clip 130 also includes a hub 150 that protrudes up when the case 100 is opened (see FIG. 3) and may be used to fasten (see FIG. 2) a DVD or other device having, for example, a generally circular hole. The hub 150 may fasten a DVD using, for example, a lip or other structure as is commonly known.

The right side 120 of the case 100 typically has a hub 155 or other mechanism located at a position 220. The hub 155 is used, in a typical manner, to fasten a first disc 160 or other device having, for example, a generally circular hole. However, other implementations do not include the hub 155. Rather, these other implementations retain the first disc 160 using, for example, one or more ridges 165 or one or more tabs 170 located on the right side 120 outlining a portion of the intended perimeter of the first disc 160.

By folding the left side 110 over the right side 120, for example to close the case 100, the hub 150 engages the position 220 by engaging either the hole in the first disc 160 or the hub 155. This engagement serves to help retain the first disc 160. For example, if the first disc 160 is dislodged from the hub 155 (or, for example, from the ridges 165 or the tabs 170 that may be positioned on the perimeter of the first disc 160), then the engagement of the hub 150 restricts the first disc 160 from being slid out of the case 100.

Figure 2:
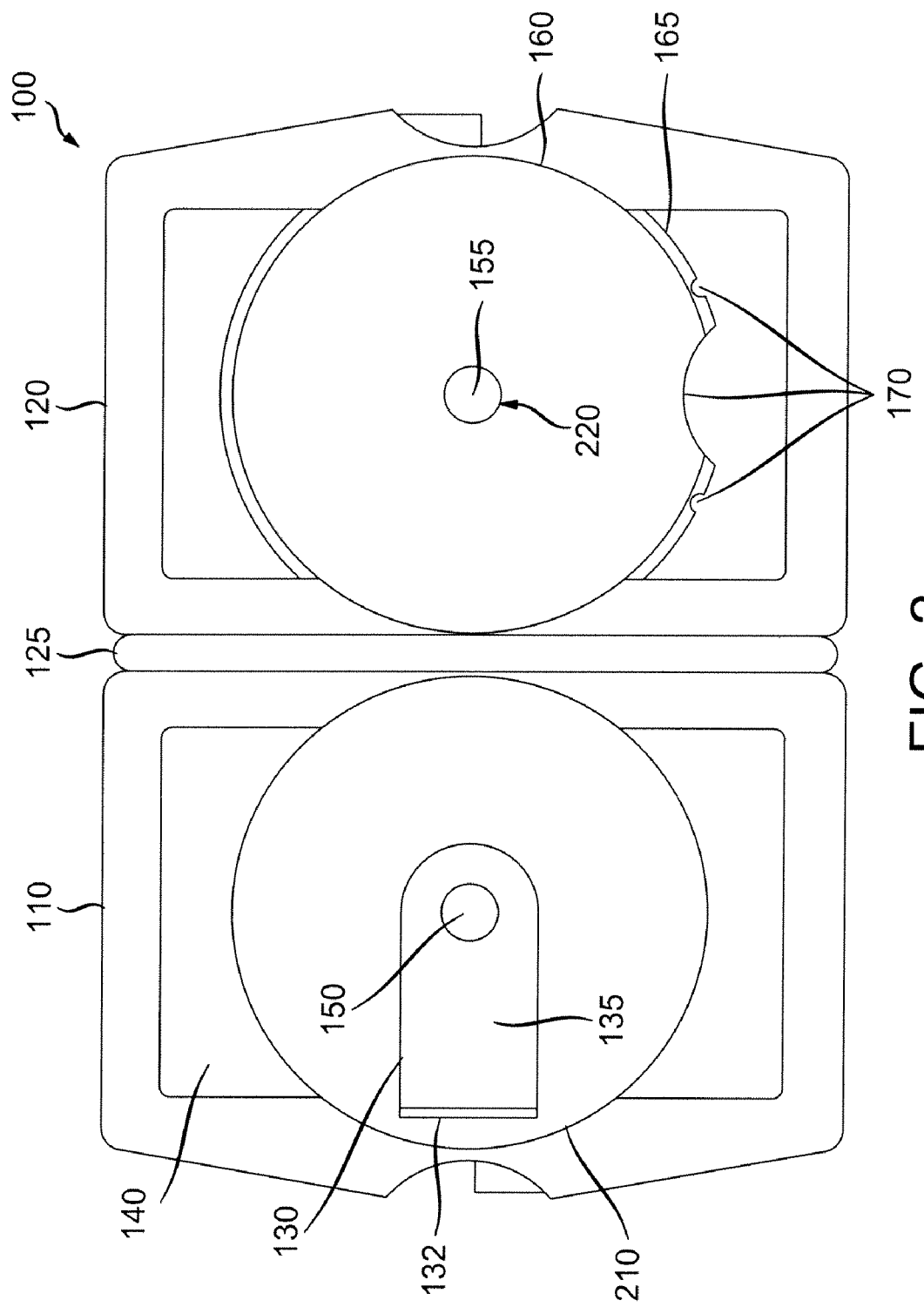
FIG. 2 shows the case of FIG. 1 further showing a disc attached to the leaflet clip.

Referring to FIG. 2, a top view of the opened case 100 is shown with a second disc 210 fastened to the hub 150. The second disc 210 is shown as a clear disc in FIG. 2. Upon closing the case 100 (for example, by folding the left side 110 to overlie the right side 120), with or without the second disc 210 inserted and fastened, the hub 150 will lie in registration with the hub 155 to help retain the first disc 160 by occupying at least part of the position 220. The position 220 is the position of the hub 155 as described above.

In other implementations, the right side 120 does not have a hub, and the position 220 is the position corresponding to a hole in the first disc 160. Upon closing the case 100 in these implementations, with the first disc 160 inserted, the hub 150 lies in registration with the hole in the first disc 160.

Figure 3:
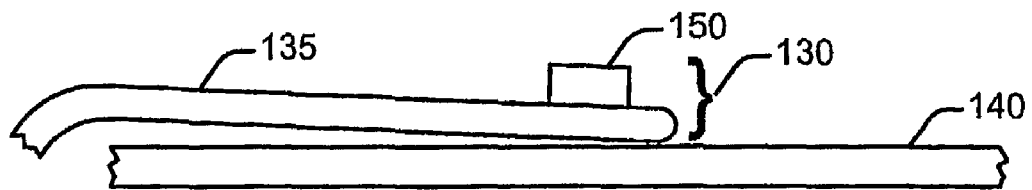
FIG. 3 is a side-view of the leaflet clip of FIG. 1 retaining material.

Referring to FIG. 3, a side view is shown of the clip 130 retaining material 140. The hub 150 protrudes up from the body 135, and allows a disc to be fastened to the hub 150. The body 135 is shown at an angle to the surface of the material 140. However, other implementations may use different angles, including an angle of zero (no angle). Additionally, the clip 130 may be spaced from the left side 110 by a distance that is determined based on an expected thickness of the material 140.

Figure 4:
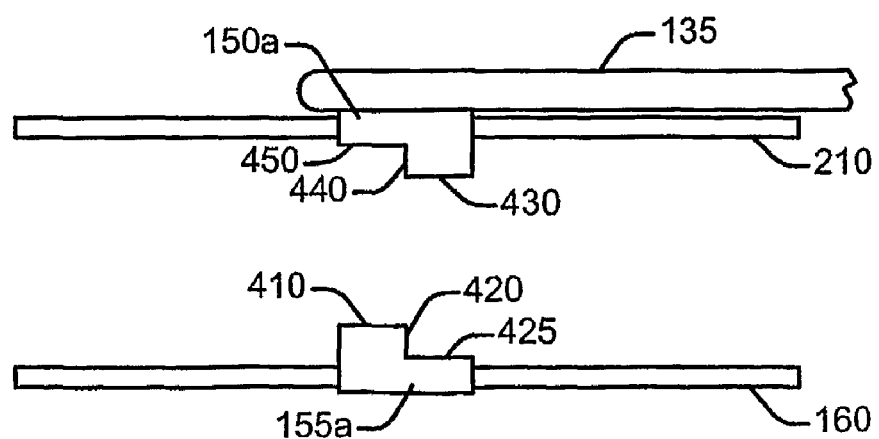
FIG. 4 is a side-view of an implementation showing complementary engaging structures of a leaflet clip and a hub.

Referring to FIG. 4, a side view is shown in which a hub 150a and a hub 155a are in close proximity as may happen, for example, when a case is almost closed. The hub 150a is a specific implementation of the hub 150, and the hub 155a is an implementation of the hub 155 of FIG. 2 occupying the position 220. In implementations in which the hub 150 of FIG. 2 engages the hub 155 of FIG. 2 (as opposed to engaging the hole in the first disc 160, for example), the two hubs may be designed with a variety of configurations. FIG. 4 shows a configuration in which the two hubs 150a and 155a have a complementary configuration, as described below.

Figure 5:
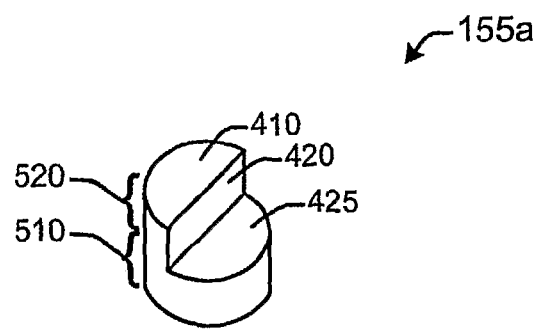
FIG. 5 is a perspective view of the hub of FIG. 4.

Referring to FIG. 5, a perspective view of the hub 155a is shown. Referring to FIGS. 4 and 5, the hub 155a includes a top surface 410, a side surface 420, and a bottom surface 425. The hub 150a of FIG. 4 includes a bottom surface 430 that is complementary to top surface 410, a side surface 440 that is complementary to side surface 420, and a top surface 450 that is complementary to bottom surface 425. When the case is closed and the hubs 150a and 155a engage each other, the surfaces 410 and 430 extend past each other forming a physical barrier that inhibits the discs 160 and 210 from being removed. When the case is closed, the side surfaces 420 and 440 will face each other and may, but need not, touch each other. Similarly, (1) top surfaces 410 and 450 will face each other and may, but need not, touch each other, and (2) bottom surfaces 425 and 430 will face each other and may, but need not, touch each other.

Other implementations may use a variety of complementary surface configurations, mating configurations, or locking configurations. For example, the hub 150a may define a hole, and the hub 155a may provide a protrusion (also referred to as an extension) that is inserted at least partially into the hole. Additionally, as FIG. 5 and the discussion of FIG. 5 indicate, implementations need only provide a protrusion on either one of the hubs 150a and 155a, but may provide protrusions on both of the hubs 150a and 155a.

FIG. 5 also illustrates a division of the hub 155a into two portions including a retaining portion 510 for retaining a disc, and an engaging portion 520 for engaging a second disc or a second hub as explained above. Although not illustrated, the retaining portion 510 typically includes a ridge or other structure as commonly known to help retain a disc. The engaging portion 520 is illustrated as a protrusion. Many implementations include a protrusion for engaging the other hub or disc, but non-protruding features are also contemplated in addition to or in lieu of a protrusion. Although FIG. 5 only shows the division of the hub 155a, the hub 150a can similarly be divided into a retaining portion and an engaging portion.

Figure 6:
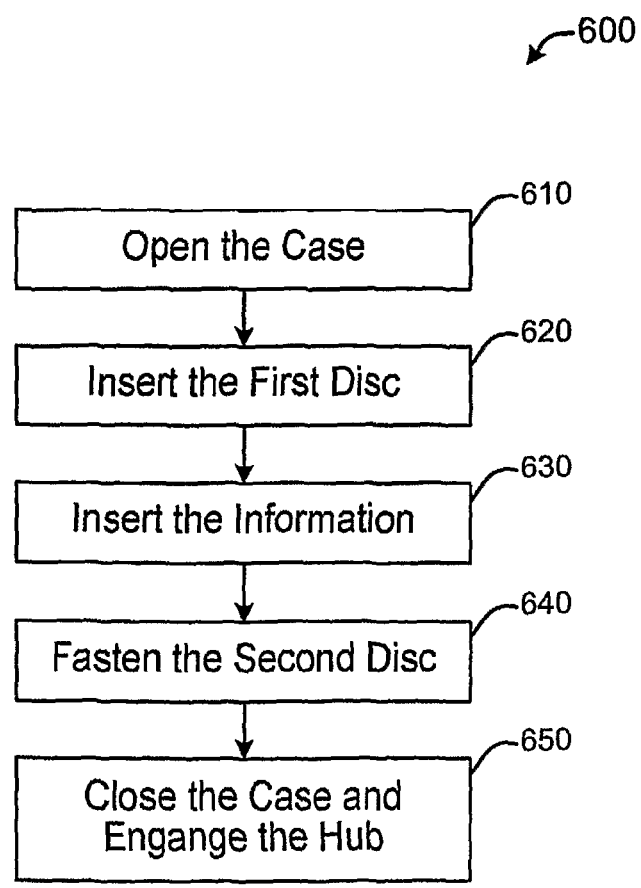
FIG. 6 is a flowchart of a method implementation for using a leaflet clip having a hub.

Referring to FIG. 6, a process 600 is shown for inserting information material and two discs into the case 100. The process 600 is described with respect to the case 100, but may be modified to support other implementations that may differ from the case 100. The process 600 also may be varied and still achieve the goals of inserting leaflets and two discs.

The process 600 includes opening the case 100 (operation 610) and inserting the first disc 160 (operation 620). The first disc may be fastened to a hub, but need not be. For example, the case 100 may provide a ridge or other structure that, for example, serves as a guide on the perimeter of the first disc and helps to maintain the first disc in place.

The process 600 further includes inserting the information 140 under the clip 130 (operation 630). In this implementation, the information 140 is retained by the clip 130 without need for additional retention devices such as, for example, one or more tabs that would overlie a portion of the perimeter of the information 140 (as is commonly known), or an additional clip. The implementation thus provides a single device for retaining the information 140, although other implementations provide multiple devices. A retaining device may provide only a single point of contact with the information 140, or may provide multiple points of contact. Further, in addition to providing one or more retaining devices, an implementation may provide guides for the information 140, such as, for example, an edge on the left side 110 around the perimeter of the location at which the information 140 is to be inserted.

The process 600 includes fastening the second disc 210 on the hub 150 (operation 640). The process 600 also includes closing the case 100 which includes engaging the hub 150 with the position 220 (operation 650). In an implementation in which the case 100 includes a second hub (for example, the hub 155) at the position 220, then engaging the hub 150 with the position 220 may include engaging the hub 150 with the second hub 155. In an implementation in which the case 100 does not include a hub at position 220, then engaging the hub 150 with the position 220 may include engaging the hub 150 with a hole defined by the first disc 160.

The process 600 may be performed in whole or in part by one or more of a variety of actors. For example, a machine may perform the process 600 in an automated manner to package DVDs for sale. The machine may be programmed with instructions for carrying out the operations of the process 600, and the instructions may be stored on a storage device and executed by a processor, for example.

As used in this disclosure, a processor may include one or more of a variety of processing devices including, for example, a computer, a microprocessor, an integrated circuit, or a programmable logic device. Additionally, as used in this disclosure, a storage device for storing program instructions may include one or more of a variety of devices including, for example, a hard disk, a compact diskette ("CD"), a DVD, a random access memory ("RAM"), a read-only memory ("ROM"), or internal registers or other memory within a processor. Further, as used in this disclosure, instructions may be, for example, contained in hardware, in firmware, in software, or in an electromagnetic wave.

Figure 7A:
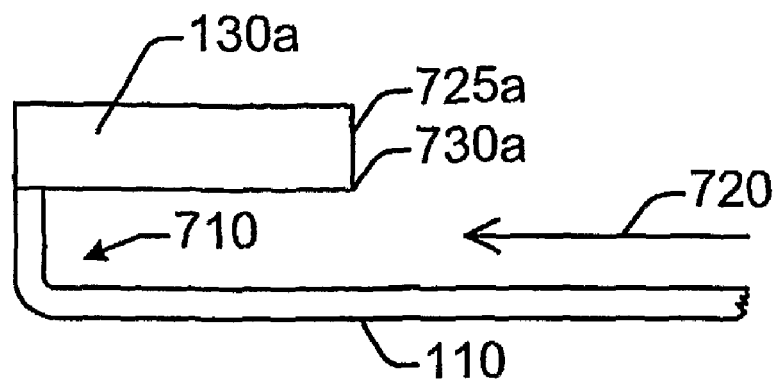
FIG. 7a is a side-view of an implementation of a leaflet clip having a non-chamfered corner.

Referring to FIG. 7a, a side view is shown of a leaflet clip 130a attached to the outer edge of the left side 110 of a case. The leaflet clip 130a is an implementation of the leaflet clip 130. There is a gap 710, between the leaflet clip 130a and the left side 110 of the case, for inserting leaflets or other material. An arrow 720 shows the direction of insertion of the material. The leaflet clip 130a has an end surface 725a and a corner 730a. The end surface 725a and the corner 730a may interfere with the insertion of the material if the material hits the end surface 725a while being inserted along the direction of the arrow 720.

Figure 7B:
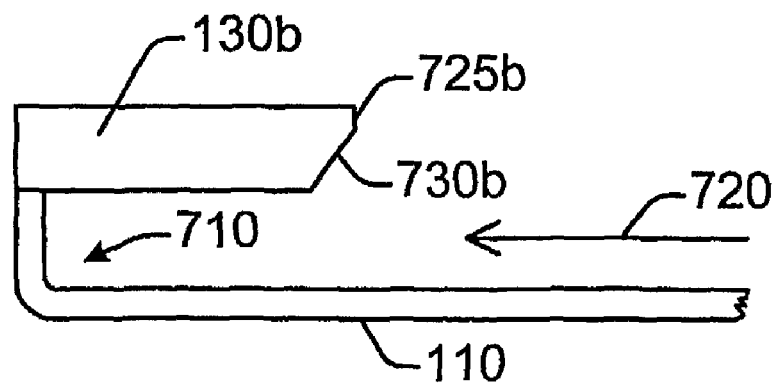
FIG. 7b is a side-view of an implementation of a leaflet clip having a chamfered corner.

Referring to FIG. 7b, an alternate implementation of the leaflet clip 130 is shown that reduces the interference with the insertion of the material. A leaflet clip 130b is attached to the outer edge of the left side 110 of the case, and is separated from the left side 110 by the gap 710. However, the leaflet clip 130b includes a shortened end surface 725b, and a chamfered corner 730b that reduces interference with the insertion of the material. As material is inserted into the gap 710 along the direction of the arrow 720, if the material strikes the chamfered corner 730b, then the chamfered corner 730b tends to guide the material into the gap 710. Conversely, the end surface 725a and the corner 730a tend to prevent the material from entering the gap 710 if the material strikes the end surface 725a.

Figure 8:
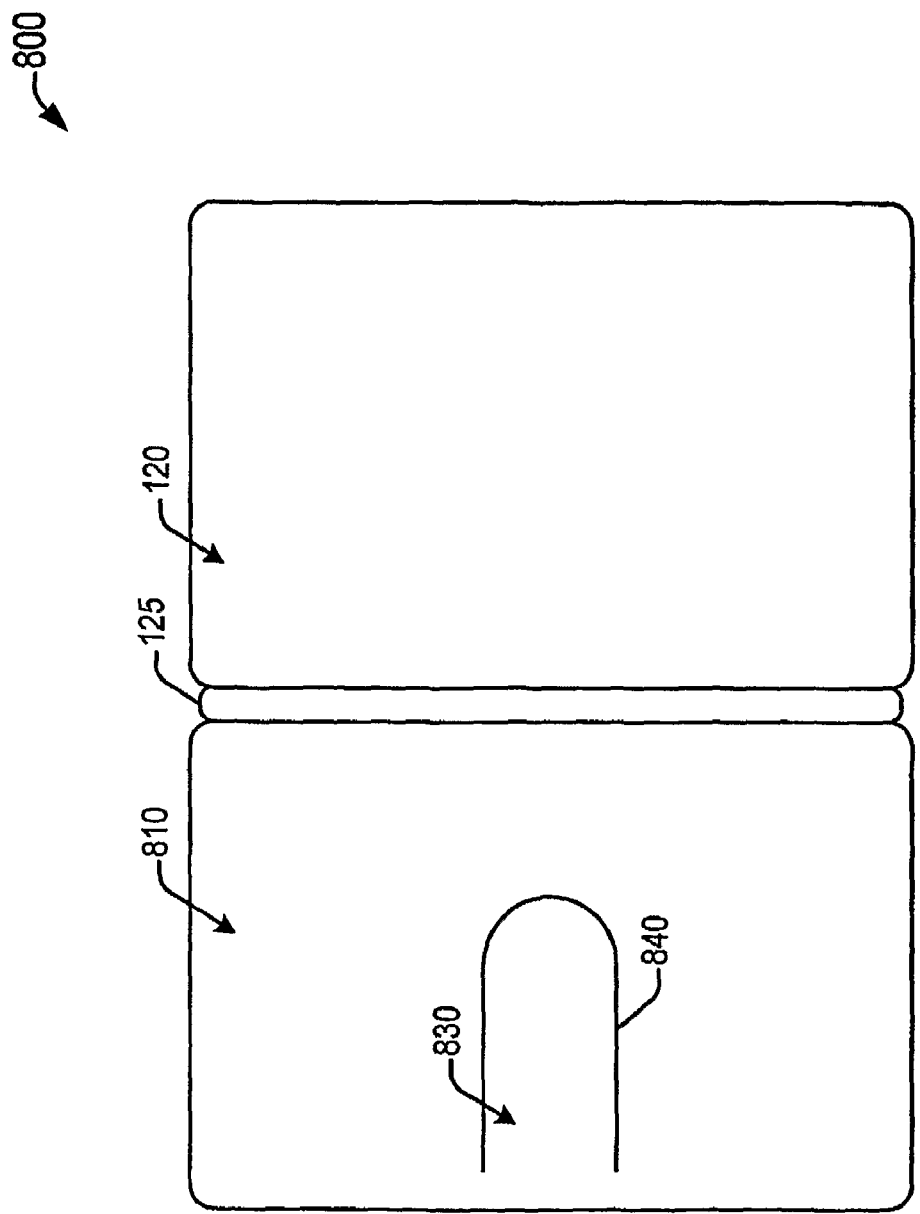
FIG. 8 shows an implementation of a case with a leaflet clip cut out of the body of the case.

Referring to FIG. 8, an implementation is shown in which a leaflet clip is formed out of a portion of the left-hand panel of the case. A case 800 includes the right side 120 as previously described, the integral hinge 125 as previously described, and a left side 810. The left side 810 includes a leaflet clip 830 having an exposed perimeter 840. The leaflet clip 830 is formed from the left side 810 by cutting the left side 810 along the desired position for the exposed perimeter 840. The left side 810 is formed of a material that is flexible enough to allow the portion of the left side 810 that now forms the leaflet clip 830 to be flexed upward allowing leaflets or other material to be inserted. The edges of the leaflet clip 830 may be chamfered, or other common techniques may be used, to allow leaflets or other material to be inserted and retained without being damaged.

Yet further implementations may attach a clip arm to a case at a different location, such as, for example, at the innermost (right) side, the top, or the bottom of the left side 110 of the case 100. The clip arm also, or alternatively, may rotate about a pivot point to allow leaflets or other material to be inserted. The pivot point may be located at, for example, the position 132 at which the leaflet clip 130 attaches to the case 100. The clip arm also may have multiple points of retention or contact with the leaflets.

In further implementations, the hubs also may have various different shapes, such as, for example, a hexagonal shape. At least a portion of the shape of a hub will generally be substantially matched to the shape of a hole in a DVD or other item that is to be fastened by the hub.

Implementations also may perform one, two, or three of the main functions enumerated earlier, as well as other functions. For example, a first implementation provides a clip arm that retains information, but the clip arm does not have a hub for fastening a second disc or a structure for engaging a hub or a hole and helping to retain a first disc. A second implementation provides an arm that includes a hub for fastening a disc but has no structure for engaging another hub or a hole, and also does not provide any retention for documentation. A third implementation provides an arm that does not retain documents or include a hub, but does include a protrusion for engaging a hub or a hole. Additional implementations include structure for performing various combinations of the three functions.

The techniques and products described in this disclosure can be applied to a variety of cases or storage devices, and the cases may be referred to using a variety of terms, such as, for example, a media case, a media container, a storage container or case, a security container or case, or a security storage container or case. Larger numbers of products also may be stored in the case. For example, the implementation that uses two hubs may store four DVDs by, for example, storing two DVDs on each of two hubs. Cases may be used to store a variety of different products, such as, for example, a DVD, a CD, a Blu-ray disc, or an HD DVD.

Many of the products that a case may store may be referred to as a "disc." The term "disc" may refer to the above-mentioned "discs" (DVD, CD, Blu-ray, HD DVD) and may also be used to refer to other media for storing or recording content, such as, for example, a 3.5 inch computer disc, a VHS tape, a 5 inch floppy disc, or a laserdisc. The content stored or recorded on a disc may be analog or digital, and may be stored or recorded in one or more of various manners, including, for example, electronically, optically, mechanically, or magnetically.

Many implementations store one or more discs between two sides (for example, the left side 110 and the right side 120) of a case. The sides may be fixed in one configuration, or may adopt a variety of configurations. The sides may be coupled together through a hinge, such as, for example, the integral hinge 125, or an "accordion-type" expanding hinge in which the two sides always overlie each other but at a varying distance. Additionally, a hub or protrusion or other features described herein may be affixed to a surface other than a side of a case. For example, a case may include a divider between the first side and the second side, with the divider having a hub for storing a disc and for engaging another hub.

The term "hub" has been used to describe a feature allowing a disc to be fastened. Configurations of hubs are commonly known. More generally, a hub may be referred to as a fastener and includes other structures designed to fasten a disc. Implementations alternatively need only hold a disc, without fastening the disc to the case. Disc holders include, of course, hubs and other fasteners, but also include ridges around a perimeter of a disc and protrusions designed to penetrate a center hole of a disc without fastening the disc. A disc is retained if the disc is, for example, held or fastened.

At least one implementation provides a case that holds a single disc. The single disc is held by a disc holder attached to a leaflet clip on one side of the case, and there is no disc holder (including a hub, ridges, tabs, etc.) on the other side of the case. The disc holder on the leaflet clip also may provide an engaging portion that helps to retain or to lock the single disc by engaging a portion of the other side of the case. The portion may include, for example, a structure that is complimentary to the engaging portion.

Various implementations may provide a case with one or more of the following advantages: the case may include a device for holding a disc and securing printed information, the case may engage a disc so as to provide a physical barrier inhibiting dislodgement of the disc from a hub.

Various implementations are described as including components that are coupled together. Two components are considered to be coupled when the two components are, for example, directly coupled to each other, or indirectly coupled to each other through one or more intervening components.

The various aspects, features, and implementations may be implemented in one or more of a variety of manners, even if described above without reference to a particular manner or using only one manner. For example, the various aspects and features may be implemented using, for example, one or more of a method, an apparatus, an apparatus for performing a method, a program or other set of instructions, an apparatus that includes a program or a set of instructions, and a computer readable medium.

The details of one or more implementations are set forth in this disclosure. However, other features will be apparent from the disclosure, including the figures and the claims. Additionally, it will be understood that various modifications may be made. For example, elements of different implementations may be combined, supplemented, modified, or removed to produce other implementations. Accordingly, other implementations are within the scope of the following claims.

The invention claimed is:

1. An apparatus comprising:
   a first side;
   a second side;
   a retention device including an arm flexibly coupled to the first side, the arm configured to flexibly apply pressure to material arranged between the first side and the arm, the arm including a first arm side configured to be oriented toward the material, and a second arm side configured to be oriented away from the material; and
   a first fastener disposed on the second arm side and configured to retain a first disc on the second arm side.

2. The apparatus of claim 1 wherein the first fastener comprises a first hub.

3. The apparatus of claim 1 wherein the first fastener comprises:
   a retaining portion configured to retain the first disc; and an engaging portion configured to retain a second disc.

4. The apparatus of claim 1 wherein:
   the apparatus further comprises a second fastener configured to retain a second disc, and the first fastener comprises:
   a retaining portion configured to retain the first disc; and
   an engaging portion configured to engage the second fastener.

5. The apparatus of claim 4 wherein the second fastener comprises a hub.

6. The apparatus of claim 4 wherein:
   the first side and the second side have at least one configuration in which the first side and the second side at least partially overlie each other,
   the second fastener is disposed on the second side, and the engaging portion is configured to engage the second fastener when the first side and the second side are in the at least one configuration.

7. The apparatus of claim 1 wherein the apparatus is a case for holding a disc, and the case comprises:
   a hinge coupled to both the first side and the second side, the hinge allowing the first side to fold over toward the second side such that the first side and the second side at least partially overlie each other.

8. The apparatus of claim 7 wherein:
   the second side is configured to retain a second disc, and the first fastener is configured to retain the second disc when the first side is folded over the second side.

9. The apparatus of claim 8 wherein the first fastener comprises a protrusion for retaining the second disc.

10. The apparatus of claim 1 wherein the first fastener is further configured to retain the first disc by engaging a center hole of the first disc.

11. The apparatus of claim 1 wherein the retention device comprises a leaf spring clip, and spring tension of the leaf spring clip applying the pressure to the material.

12. The apparatus of claim 1 wherein the applied pressure urges the material toward the first side.

13. A method comprising:
   securing material within a container having a first side, a second side, and a retention device, the retention device including an arm flexibly coupled to the first side of the container configured to flexibly apply pressure to the material arranged between the first side and the arm, the arm including a first arm side configured to be oriented toward the material, and a second arm side configured to be oriented away from the material; and
   securing a first disc on the second arm side using a retaining portion of the arm.

14. The method of claim 13 further comprising:
   securing a second disc in the container; and
   closing the container and, in the process of closing the container, retaining the secured second disc with a portion of the retention device.

15. The method of claim 14 wherein the method further comprises:
   fastening a second disc to the second side.

16. The method of claim 14 wherein retaining the secured second disc comprises bringing the first side into closer proximity with the second side by closing the container.

17. The method of claim 14 wherein the method further comprises:
   fastening a second disc to a hub on the second side; and
   engaging the hub with a portion of the retention device so as to restrict movement of the second disc.

18. The method of claim 13 wherein the retention device comprises a leaf spring clip, and spring tension of the leaf spring clip applying the pressure to the material.

19. The method of claim 13 wherein the applied pressure urges the material toward the first side.

* * * * *